(12) United States Patent
Susor

(10) Patent No.: US 7,684,946 B2
(45) Date of Patent: Mar. 23, 2010

(54) WEIGH-IN-MOTION SYSTEM WITH AUTO-CALIBRATION

(75) Inventor: Robert Susor, Westerville, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 316 days.

(21) Appl. No.: 11/957,801

(22) Filed: Dec. 17, 2007

(65) Prior Publication Data

US 2009/0151421 A1    Jun. 18, 2009

(51) Int. Cl.
  *G01G 23/01* (2006.01)
(52) U.S. Cl. ........................................ 702/101
(58) Field of Classification Search .......... 702/101
  See application file for complete search history.

(56) References Cited

U.S. PATENT DOCUMENTS

| | | | |
|---|---|---|---|
| 4,957,178 A | 9/1990 | Mills | |
| 5,002,141 A | 3/1991 | Loshbough et al. | |
| 6,137,066 A | 10/2000 | Wanelid | |
| 6,459,050 B1 | 10/2002 | Muhs et al. | |
| 6,980,093 B2 | 12/2005 | Oursler et al. | |
| 7,105,751 B2 * | 9/2006 | Terada et al. | ............ 702/101 X |

* cited by examiner

*Primary Examiner*—Thomas P Noland
(74) *Attorney, Agent, or Firm*—Standley Law Group LLP

(57) ABSTRACT

Weigh-in-motion (WIM) systems for weighing moving vehicles, the systems having the ability to automatically determine and periodically apply calibration factors to WIM scale readings. Auto-calibration may include transferring both WIM and static weight readings for the same vehicle to a database, associating the weight readings, collecting a number of such weight readings, and analyzing the differences between the WIM and static weight readings to calculate WIM scale calibration factors. The calibration factors may be based on vehicle characteristics such as vehicle weight, vehicle class and/or vehicle speed at the WIM scale.

25 Claims, 5 Drawing Sheets

US 7,684,946 B2

WEIGH-IN-MOTION SYSTEM WITH AUTO-CALIBRATION

BACKGROUND OF THE INVENTIVE FIELD

The present invention is directed to weigh-in-motion (WIM) systems for weighing moving vehicles. More particularly, the present invention is directed to a WIM system having the ability to automatically determine and periodically apply calibration factors to WIM scale readings.

Weigh-in-motion (WIM) systems permit the weighing of vehicles, such as tractor trailers, while the vehicles are in motion. Thus, WIM systems can minimize the number of vehicles that must be diverted from a roadway to a static scale or static weighing station.

Various types of WIM scales currently exist. Commonly, but without limitation, WIM scales may be of piezoelectric sensor, quartz digital sensor, bending plate or load cell design. Regardless of the particular design of a WIM scale, however, there are certain difficulties associated with the weighing of moving vehicles. Particularly, the various dynamic forces exerted on a WIM scale by a moving vehicle can effect its weight reading and, therefore, the detected weight of an associated vehicle may be inaccurate. Vehicle characteristics such as classification, length, weight, and speed can all influence the output of a WIM scale. Non-vehicle characteristics such as the condition and levelness of the pavement surrounding a WIM scale can also effect weight readings output thereby.

These difficulties generally result in WIM scales having a degree of accuracy that is less than that of static weighing systems. In order to improve the accuracy of a WIM scale, a calibration factor may be applied thereto. The calibration factor is used to counter the undesirable effects that the aforementioned dynamic loading and/or site conditions may have on the weight readings of a WIM scale.

Currently, such calibration factors must be determined and applied by a manual process. Generally, at least certain of the vehicles crossing a WIM scale are identified and directed to a static scale. The weight of a vehicle as determined by the static scale, is compared to the weight of the vehicle as estimated by the WIM scale. Comparisons between the WIM estimates and the static weights for a number of vehicles are made, and a calibration factor is determined. The calibration factor is then applied to the vehicle weight readings output by the WIM scale to ensure that the weight estimates are as close as possible to the true static weights of the associated vehicles.

Unfortunately, current WIM scale calibration processes are manual in nature. That is, the vehicles whose weights will be compared are manually identified at the WIM scale, and again at the static scale to ensure the two weight readings are associated with the same vehicle. Recording of vehicle weight readings and subsequent calibration factor determination is also a manual process. Further, initial application of a calculated calibration factor and/or updating of a calibration factor are also manual processes. Because such manual processes are commonly time consuming and/or costly, WIM scale re-calibration is typically performed on an annual basis at best, if at all. This is problematic because changes in site and/or WIM scale conditions may demand more frequent calibration factor updates. As a result, WIM systems may provide inaccurate vehicle weight estimates.

SUMMARY OF THE GENERAL INVENTIVE CONCEPT

The present invention is directed to a WIM system having an auto-calibration feature and to a method for WIM scale auto-calibration that may be applied to both new and existing WIM systems. A system and method of the present invention automatically identifies vehicles that have passed over a WIM scale and are subsequently directed to a static scale for weighing. A system and method of the present invention automatically associates the WIM scale weight estimate and static weight of each such vehicle, and stores the weight readings for future use.

Once a sufficient sample size of vehicle weight readings has been collected, a WIM scale calibration factor is automatically calculated and applied to the associated WIM scale. New calibration factors may be periodically determined and applied to the WIM scale. Such calibration factor updates may be performed on a calendar basis, or may be performed upon each collection of some predetermined number of comparative vehicle weight readings.

A system and method of the present invention also preferably monitors and collects other data associated with said vehicles, such as, without limitation, vehicle class, and vehicle speed at the WIM scale. This data is preferably also saved. This vehicle data is preferably used to determine class-based and speed-based calibration factors. Thus, different WIM scale calibration factors may be applied depending on the class and/or speed of a vehicle crossing a WIM scale. Because vehicles with different class, speed, etc., characteristics can effect the readings of a WIM scale to a different degree, determining and applying class and/or speed-based calibration factors allows the weight readings of an associated WIM scale to be as accurate as possible.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
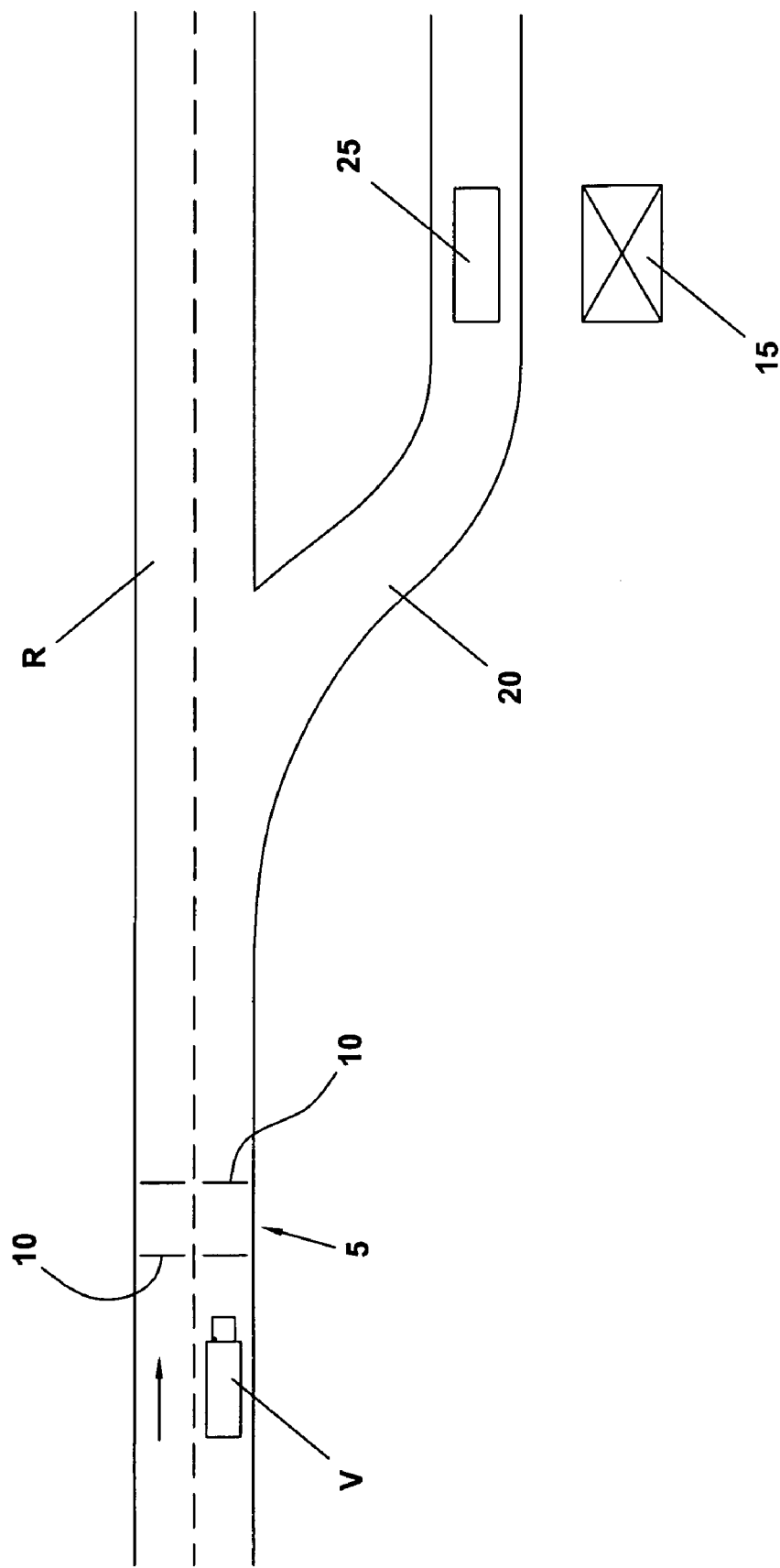
FIG. 1 depicts various elements of a typical vehicle weighing system, as such might be commonly arranged along a roadway.

FIG. 1 depicts one example of a known vehicle weighing system, such as might be commonly found along a roadway. As shown, vehicles to be weighed V, such as, but not limited to, tractor trailers, travel along the roadway R in the direction indicated by the arrow. The roadway R is commonly a highway, but may be any roadway carrying vehicles that must be weighed.

A weigh-in-motion (WIM) scale 5 is shown to reside in each lane of the roadway R, although one skilled in the art would clearly understand that a WIM scale could also be disposed in only one lane of a given roadway.

As shown, this particular each WIM scale 5 includes separate weighing sensors 10. Such a WIM scale 5 is typically able to determine the speed of a vehicle, to measure individual axle weights of a vehicle, to determine the total weight of a vehicle, to determine the class of a vehicle (such as by the distance between axles), and/or to determine various other vehicle characteristics. The WIM scales 5 are positioned such that vehicles to be weighed V will drive over the WIM scales as the vehicles traverse the roadway R.

In response to being driven over by a vehicle to be weighed V, a WIM scale 5 will output at least an estimate of the weight of the vehicle. A WIM scale 5 may also provide other information about the vehicle to be weighed V, such as but no limited to, the other vehicle characteristics mentioned above.

As can be observed in FIG. 1, the WIM scales 5 are located upstream from a static weighing station 15, which includes a pull-off 20 leading from the roadway R to one or more static scales 25. The static scales are used to obtain accurate weights of at least certain of the vehicles to be weighed V, which vehicles are directed to the weighing station 15 based on any of several criteria. For example, and as is well understood in the art, vehicles to be weighed V may be directed to the weighing station 15 based on random selection, based on vehicle count, or based on a signal (e.g., an overweight signal) from an upstream WIM scale 5. Other selection criteria may also be employed.

When a vehicle to be weighed V is directed to the weighing station 15 after passing over a WIM scale 5, the vehicle is typically identified and associated with weight data from the WIM scales 5 that is typically sent to the weighing station 15. Currently, collection of the weight data and association of the weight data with a particular vehicle is a manual process.

Once at the weighing station 15, the identified vehicle to be weighed V is directed onto a static scale 25 where an accurate vehicle weight reading is obtained. The vehicle weight reading may be used for various purposes, such as to collect taxes or to levy fines against the vehicle/driver. The vehicle weight reading obtained from the static scale 25 may be recorded and associated with the estimated weight reading for the vehicle provided by an upstream WIM scale 5. Currently, if performed at all, this task is also performed manually.

As described briefly above, a number of associated weight readings can be saved and subsequently compared to calculate a correction factor for a WIM scale. That is, differences between WIM scale estimated vehicle weight readings and the actual weights of the associated vehicles as determined by a static scale(s), can be used to determine a calibration factor that may be applied to the WIM scale so as to improve the accuracy of the weight readings output therefrom. Again, however, this is currently a manual process that is both time consuming and generally costly. As such, WIM scale calibration factors are infrequently updated. Unfortunately, because site conditions, WIM scale conditions, and/or other conditions may change frequently over time, infrequent updating of calibration factors may render inaccurate the estimated weight readings of associated WIM scales. As would be understood by one skilled in the art, this can be problematic for several reasons—particularly if readings from such WIM scales are being used as the sole basis for determining whether to direct vehicles to a static weighing station.

Figure 2:
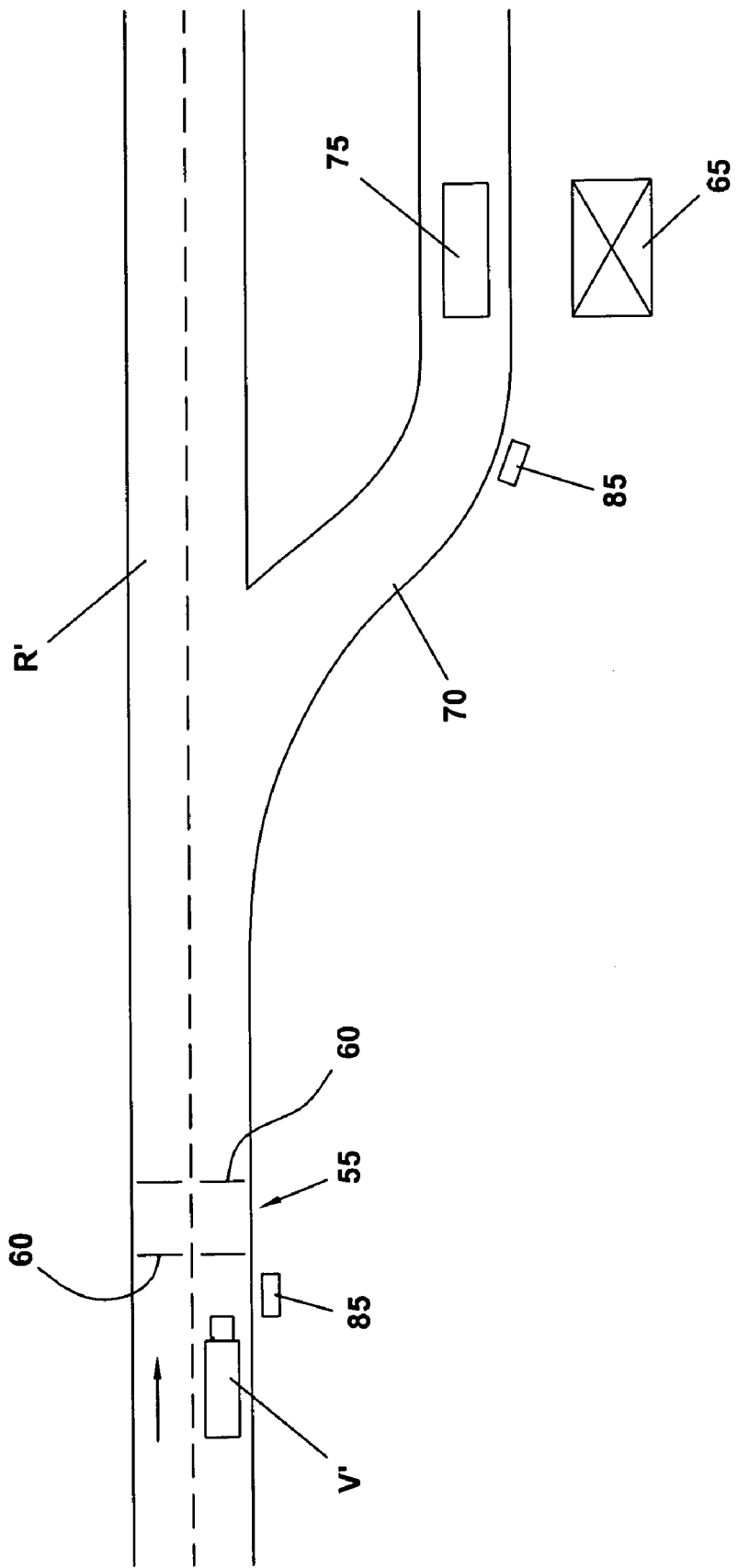
FIG. 2 depicts various elements of an exemplary WIM system of the present invention, as such might be arranged along a roadway.
Figure 3:
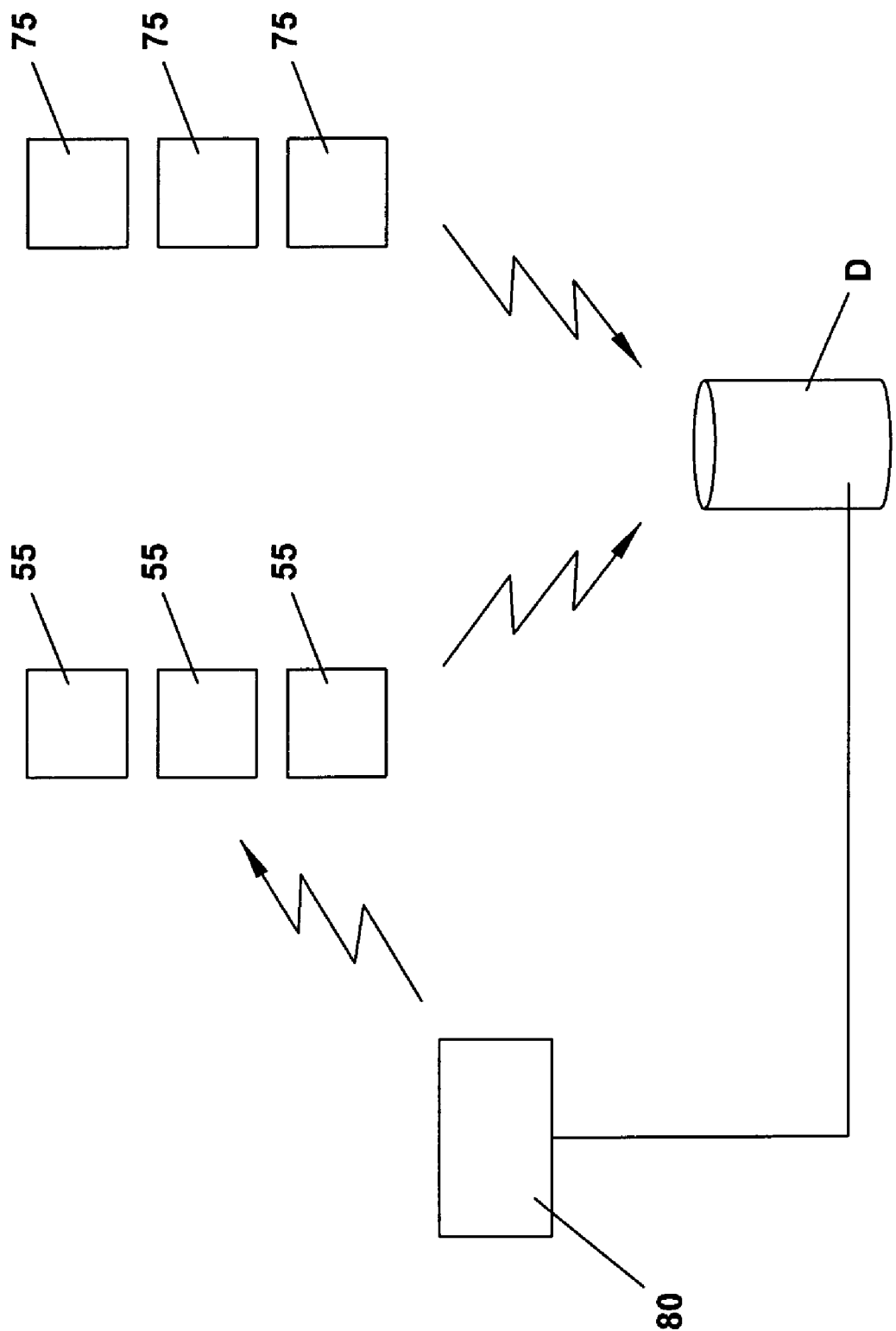
FIG. 3 schematically illustrates the WIM system of FIG. 2.

A system and method of the present invention overcomes these problems. Referring to FIGS. 2-3, an application of a system and method of the present invention can be seen. For purposes of clarity and similarity of comparison, this particular application is shown to be substantially the same as the arrangement depicted in FIG. 1. A multitude of arrangements other than that shown in FIG. 2 and described herein for purposes of illustration are also possible.

As can be observed in FIGS. 2-3, this exemplary embodiment of a WIM system 50 of the present invention again includes one or more WIM scales 55 located in a roadway R'. The WIM scales 55 are located upstream from a static weighing station 65, which includes a pull-off 70 leading from the roadway R' to one or more static scales 75. The static scales 75 are again used to obtain accurate weights of at least certain of the vehicles to be weighed V', which vehicles are directed to the weighing station 65 based on any of several criteria—such as the criteria mentioned above.

The WIM scales 55 again reside in each lane of the roadway R', although a WIM scale could also be disposed in only one lane of a given roadway. Any combination of traffic lanes and WIM scale arrangements are within the scope of the present invention.

The WIM scales 55 are shown to include separate weighing sensors 60 that are positioned such that vehicles to be weighed V will drive over the weighing platforms as the vehicles traverse the roadway R'. However, the present invention is not limited to a WIM scale having these enumerated exemplary capabilities, nor is the present invention to be considered limited to the use of any particular type/design of WIM scale. Rather, it is to be understood that a system and method of the present invention may employ a variety of WIM scale designs, and many such designs would be familiar to one skilled in the art.

The WIM system 50 additionally includes at least one database D for storing vehicle weight data, and a microprocessor-based device 80 in communication with the database(s) and WIM scale(s) 55. The database(s) may also store classification data and speed data. The microprocessor-based device 80 may include any necessary software, firmware, or hardware required to calculate WIM scale calibration factors based on at least the vehicle weight data, and to communicate said calibration factors to the WIM scale(s) 55. The database(s) D and microprocessor-based device 80 may be located at the weighing station 65 as shown, or at virtually any other location where communication with the scales and communication therebetween is possible. In one embodiment of the present invention, the database(s) D may be Internet databases.

In response to being driven over by a vehicle to be weighed V', a WIM scale 55 will output at least an estimate of the weight of the vehicle. A WIM scale 55 may also provide other information about the vehicle to be weighed V', such as but no limited to, the other vehicle characteristics mentioned above. A system of the present invention may also include one or more external means for identifying various characteristics of vehicles to be weighed V'. That is, detection devices 85 that are separate from the WIM scale(s) 55 may also/instead be employed. For example, separate vehicle speed detectors, height detectors, and/or loops and loop queues (see below) may be used, as may radio frequency identification (RFID) transmitters/receivers and other types of vehicle identifying equipment (cameras, etc.). When separate detection devices 85 are used, they may be placed at one or more locations at or near the WIM scale(s) 55, at or near the static scale(s) 75, and/or along a path therebetween. Nothing shown or described herein is to be considered as limiting to the number, type, or location of such detection devices that may be used.

Figure 4:
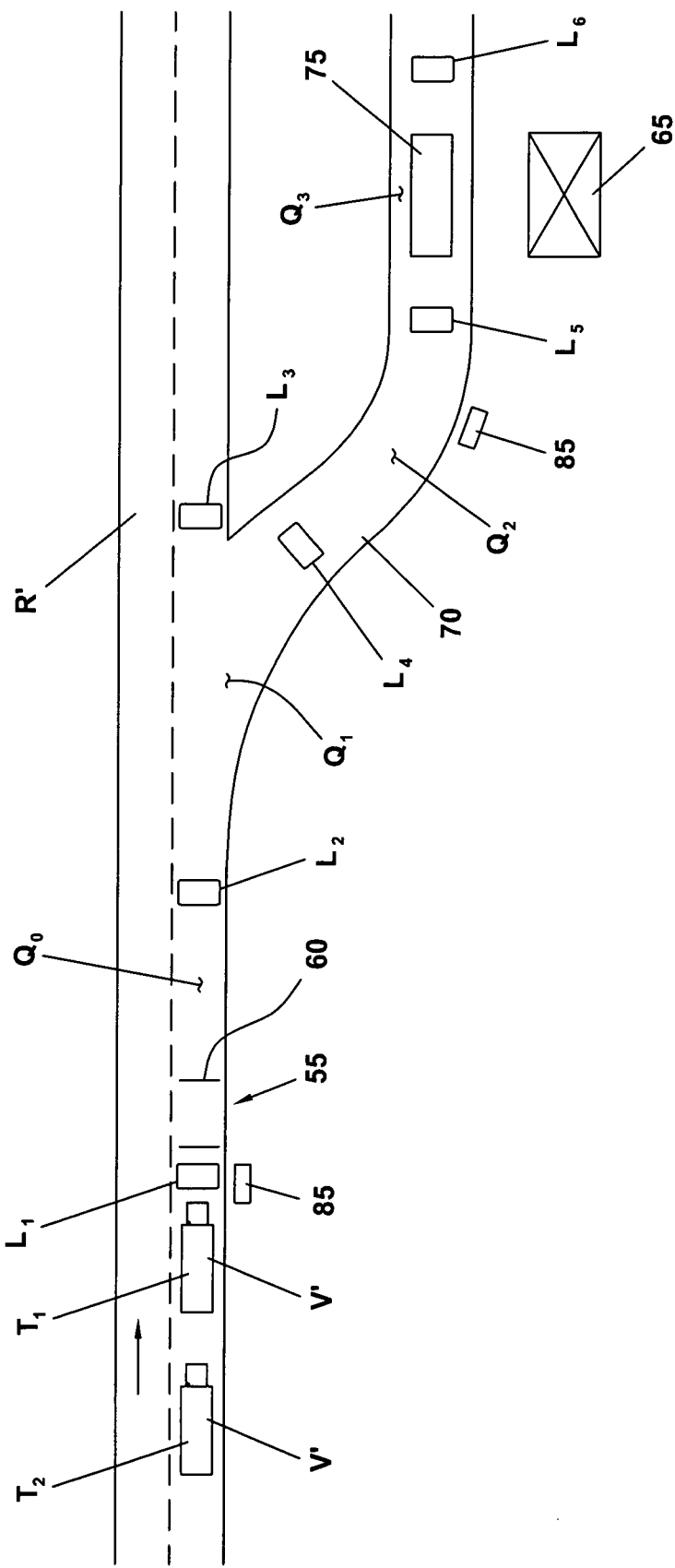
FIG. 4 depicts various elements of an exemplary WIM system of the present invention that utilizes a loop vehicle tracking network (LVTN) to identify and track vehicles from a WIM scale location to a static scale location.
Figure 5:
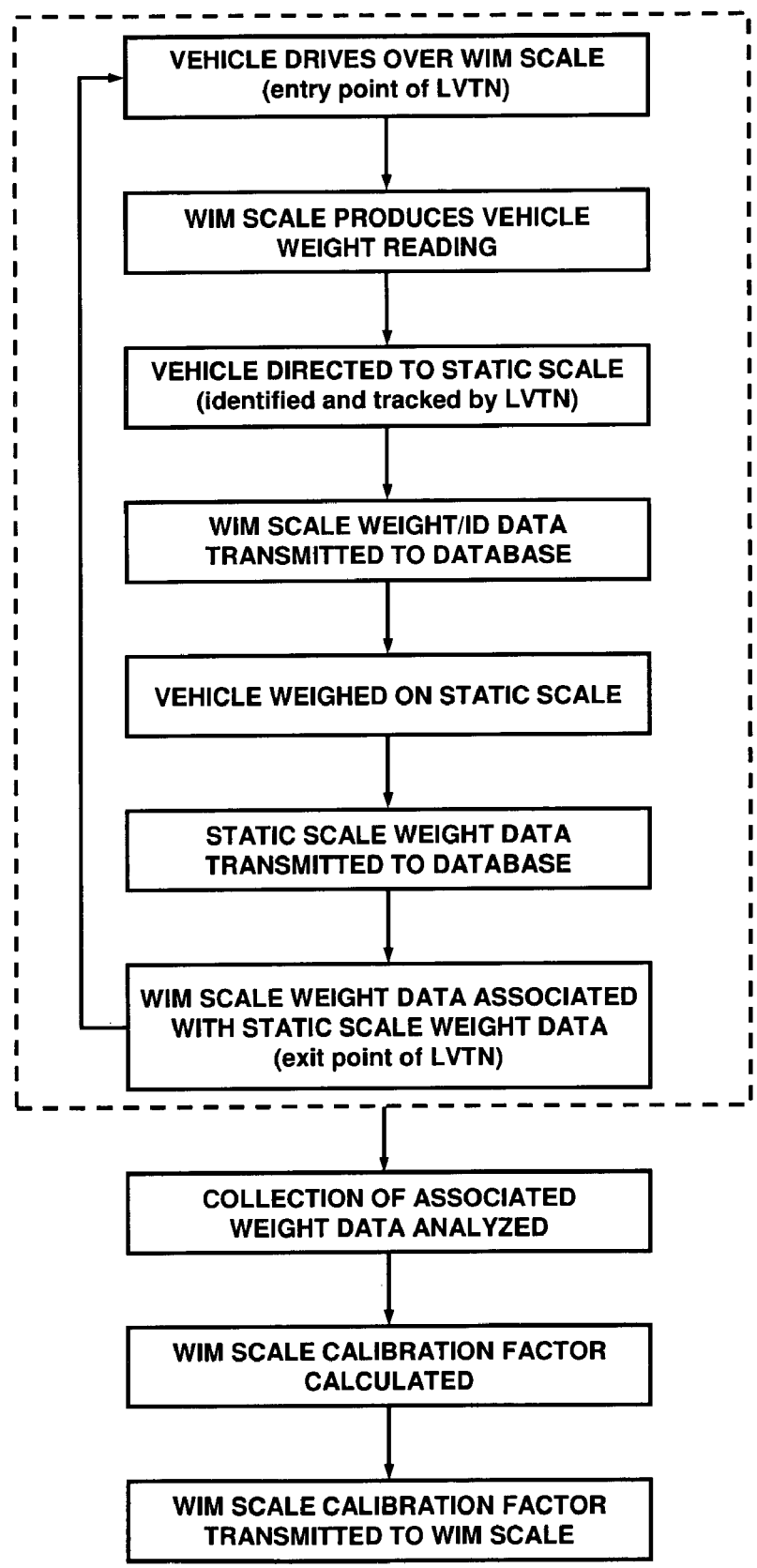
FIG. 5 is a flowchart showing a method of operation of the system of FIG. 4.

In one exemplary embodiment of the present invention, a loop vehicle tracking network (LVTN) is utilized to identify and track vehicles from a WIM scale(s) to a static scale(s). Referring to FIG. 4, it can be observed that this particular LVTN employs various loops and queues (i.e., the spaces between loops) for this purpose. In this embodiment, a first loop $L_1$ is positioned before the WIM scales 55 and is considered to be an entry point of the LVTN, as well as the beginning of a first queue $Q_0$. The next loop $L_2$ is downstream of the first loop $L_1$, and also serves as the end point of the first queue $Q_0$ and the starting point of a second queue $Q_1$. The second queue $Q_1$ continues until a third loop $L_3$ (which is an exit point of the LVTN) or a fourth loop $L_4$ is reached, each of the third and fourth loops being downstream from the second loop $L_2$. The fourth loop $L_4$ represents the end of the second queue $Q_1$ and the start of a third queue $Q_2$. The third queue $Q_2$ continues until a fifth loop $L_5$ is reached. The fifth loop $L_5$ of this exemplary embodiment resides just prior to the static scale 75. The fifth loop $L_5$ also resides at the beginning of a final queue $Q_3$ that extends between the fifth loop and a sixth loop $L_6$ that is located at the exit side of the static scale and an exit point of the LVTN.

In the particular configuration shown in FIG. 4, the final queue functions as the static scale queue, and once a vehicle enters this queue the WIM scale data (e.g., weight, classification, speed) is transmitted to an auto-calibration database (e.g., static scale computer). At this point, and is described in more detail below, the WIM scale data may be merged with the associated static scale weight and stored in the database as a vehicle record.

A system of the present invention manages the queues and tracks vehicles as they enter and exit the queues on a first-in, first-out, basis. More particularly, as illustrated in FIG. 4, the vehicle designated as $T_1$ will be the first vehicle to cross loop $L_1$ and enter the first queue $Q_0$, and the vehicle designated as $T_2$ will be the second vehicle to cross loop $L_1$ and enter the first queue $Q_0$. Because vehicles are prohibited from passing one another in the area of the LVTN, the second vehicle $T_2$ cannot pass the first vehicle $T_1$. As such, the LVTN knows that the first and second vehicles $T_1$, $T_2$ will also pass over and through the remaining loops and queues in the same order. Therefore, it can be understood that all the vehicles are tracked by the LVTN as first-in, first-out through all queues. A system of the present invention may include as many loops and queues as deemed necessary for proper vehicle tracking. In some applications, the LVTN may utilize double loops (i.e., two spaced-apart loops) to confirm vehicle speed and length.

According to the present invention, and as illustrated in FIGS. 3-4, when a vehicle to be weighed V' is directed to the weighing station 65 after passing over a WIM scale 55, the vehicle is automatically identified by any of the devices and techniques described above. In an exemplary embodiment of the present invention, weight data associated with the vehicle is also automatically sent by the WIM scale to the appropriate database D located at the weighing station. In other embodiments, the weight data may be sent to a database at a different location(s). Whatever the location, at least some of the WIM scale weight data is saved in the database for subsequent use, as is described in more detail below.

Once at the weighing station 65, the identified vehicle to be weighed V' is directed onto a static scale 75 where an accurate vehicle weight reading is obtained. According to the present invention, static weight data obtained from the static scale(s) 75 for at least some of the vehicles analyzed by the WIM scale(s) 55 is also stored. The stored static scale weight data is automatically associated with the stored WIM scale weight data for the same vehicle. The WIM scale weight data and the static scale weight data may be stored in the same database D, or in separate databases. The database(s) D may be located at the location of the static scale(s) 75 (i.e., the weigh station 65), or at a remote location(s). Other weight data storage locations are also possible, some of which are described in more detail below.

Transmission of the static scale weight data and WIM scale weight data to a storage device/location may occur by any data transmission technique currently known or yet to be developed. Such data transmission may be wired or wireless in nature A network, such as a LAN, WLAN, WAN, or the Internet may or may not be associated with such data transmission. Weight data transmission may also occur via electronic mail or through a variety of other mechanisms. In yet another embodiment, weight data may be collected at one or both of the WIM scales and static scales on any of a variety of recordable storage mediums, which can be subsequently manually transferred to another location for data analysis.

Once a sufficient sample size of static scale weight data and WIM scale weight data has been collected, the differences between associated weight readings are analyzed. Particularly, the differences between associated WIM scale weight readings and static weight readings for a number of vehicles are analyzed and used to develop a calibration factor that is applied to the WIM scale of interest in order to optimize its weighing accuracy.

The frequency at which such weight reading data analysis and scale calibration factor calculation is performed may vary. For example, the occurrence of such may be predicated upon the collection of some predetermined sample size of weight reading data, upon the passage of some predetermined time period, or upon some combination thereof. Other triggering events may also be used instead of or in conjunction with those specifically described herein. Preferably, however, such data analysis and calibration factor calculation occurs fairly frequently, so as to ensure that the weight readings produced by an associated WIM scale are, and remain, as accurate as possible.

The above description notwithstanding, it should be understood that the calculation of a new WIM scale calibration factor may or may not result in an updating of the associated WIM scale. For example, if the calibration factor resulting from a particular weight data analysis is deemed to be insignificantly different from the calibration factor already in use, updating of the associated WIM scale may be skipped.

Preferably, but not essentially, a system and method of the present invention allows for even greater WIM scale optimization. More particularly, the present invention preferably allows for the creation and updating of a plurality of WIM scale calibration factors that can be applied to the weight readings of a WIM scale based on one or more characteristics of the weighed vehicle. For example, because it is known that both vehicle speed and vehicle size (class) can effect WIM scale weight readings, calibration factors can be developed to take at least such factors into account.

To that end, one exemplary embodiment of the present invention includes calibration factors for ten (10) vehicle speed ranges and thirteen (13) vehicle classes. For example, the vehicle speed range may extend form 0-100 miles per hour and be divided into ten equal segments of ten miles per hour each (i.e., 0-10, 10-20 . . . 90-100 MPH). The vehicle classes may be based on axle spacing, gross vehicle weight, and/or other factors and combinations thereof.

Such calibration factors may be used independently, or may be combined. For example, if a Class 3 vehicle crosses a WIM scale at 60 miles per hour, a corresponding class or speed range calibration factor may be applied to the WIM scale weight readings to improve their accuracy. Alternatively, a single combined calibration factor that takes into account both the speed and class of the vehicle can be applied to the WIM scale weight readings to optimize their accuracy. A variety of other such advanced WIM scale calibration factors can be developed. Such calibration factors can be periodically re-calculated and updated as described above.

In an alternate embodiment, it is possible to employ at least some degree of user intervention with respect to the tracking, directing, and/or data entry associated with the of the present invention. For example, a weigh in motion system of the present invention may utilize an image tracking network (ITN), which allows vehicles to be visually identified. More specifically, the ITN captures images of vehicles to be weighed and displays the images on a computer monitor or some other graphical display device. A user of the system then identifies incoming vehicles based on the captured images and either directs or escorts the vehicles to a static scale, or weighs the vehicles using portable scales. Upon weighing, the user then manually inputs the static weight, classification, and speed data, which may be subsequently used to determine and apply the WIM scale calibration factors discussed above.

Various other embodiments of the present invention are possible. For example, static weighing of a vehicle is not required to occur subsequent to weighing by a WIM scale. Rather, as long as a vehicle can be identified so as to ensure the proper association of its static scale weight data and WIM scale weight data, weighing can occur in any order and at varying time intervals (so long as a load associated with the vehicle has not been altered). For example, in a variation of the arrangement shown in FIG. 2, a vehicle may be weighed on a static scale prior to being weighed on a downstream WIM scale. Weight data from each scale may nonetheless be stored, analyzed and used as described above.

Yet other embodiments of the present invention may employ alternative data storage means. For example, instead of storing static scale weight data and WIM scale weight data at a remotely located database, it should be understood that such data may be stored locally at one or both of a WIM scale and/or static scale. In one such embodiment, WIM scale weight data and static scale weight data is stored at a WIM scale (such as at a controller, indicator or load cell thereof). Static scale weight data may be transmitted to the WIM scale in any known manner, such as by the techniques described above. Data analysis and calibration factor(s) calculation may occur in any manner described above, the difference being that such data analysis and calibration factor(s) calculation occurs at the WIM scale. For example, the WIM scale may include an integral microprocessor-based device and any software, firmware, etc., necessary to complete such data analyses and calibration factor calculations. Alternatively, such analyses and calculations may be performed by a microprocessor-based device that is associated with a WIM scale.

While certain exemplary embodiments of the present invention are described in detail above for purposes of illustration, it is understood that multiple variations of such embodiments can exist. Therefore, the scope of the present invention is not to be considered limited by the exemplary disclosures made herein, and modifications are possible without departing from the spirit of the invention as evidenced by the following claims:

What is claimed is:

1. An auto-calibrating WIM system, comprising:
  a WIM scale for weighing vehicles of interest while said vehicles are in motion, said WIM scale adapted to automatically transmit weight data for at least some of said vehicles of interest to a database;
  a static scale for weighing vehicles of interest while said vehicles are at rest, said static scale adapted to automatically transmit weight data for at least some of said vehicles of interest to a database;
  vehicle identification data associated with said vehicles of interest;
  a database for receiving weight data from said at least one WIM scale and said at least one static scale, WIM scale weight data and static scale weight data for the same vehicles automatically associated in said database using said identification data;
  a microprocessor-based device in communication with said database and said WIM scale, said microprocessor-based device for analyzing a collection of associated WIM scale weight data and static scale weight data and operative to periodically calculate a new WIM scale correction factor and to apply said correction factor to WIM scale weight readings.

2. The system of claim 1, wherein said WIM scale is disposed in a roadway and said static scale is located at a downstream weigh station.

3. The system of claim 2, wherein said database is located at said weigh station.

4. The system of claim 1, wherein said database is located at said WIM scale.

5. The system of claim 1, wherein identification of vehicles of interest is performed by said WIM scale.

6. The system of claim 1, further comprising one or more detection devices for identifying vehicles of interest.

7. The system of claim 6, wherein said one or more detection devices are selected from the group consisting of speed detectors, height detectors, RFID transmitters/receivers, and cameras.

8. The system of claim 6, wherein said one or more detection devices includes a loop vehicle tracking network (LVTN).

9. The system of claim 6, wherein said one or more detection devices includes a image tracking network (ITN).

10. The system of claim 1, wherein said identification data for a vehicle of interest includes the class of said vehicle and its speed at said WIM scale.

11. The system of claim 10, wherein said WIM scale correction factor is adjusted to account for said vehicle class, said vehicle speed, or both said vehicle class and said vehicle speed.

12. The system of claim 1, further comprising a loop vehicle tracking network comprising a plurality of loops and queues for tracking said vehicles as they move between said WIM scale and said static scale.

13. A method of auto-calibrating a WIM scale, comprising:
  automatically transmitting weight data for at least some of a number of vehicles weighed by said WIM scale to a database;
  weighing some number of vehicles weighed by said WIM scale on a static scale;
  automatically transmitting weight data for at least some of said vehicles weighed by said static scale to a database;
  providing vehicle identification data for vehicles weighed by both said WIM scale and said static scale;

using said vehicle identification data to associate WIM scale weight data and static scale weight data for the same vehicles;

placing a microprocessor-based device in communication with said WIM scale and said database(s), said microprocessor-based device for analyzing a collection of associated WIM scale weight data and static scale weight data, said microprocessor-based device operative to periodically calculate a new WIM scale correction factor based on differences between said WIM scale weight data and said static scale weight data and to transmit said correction factor to said WIM scale.

14. The method of claim 13, wherein vehicle identification is performed by said WIM scale.

15. The method of claim 13, further comprising using one or more detection devices to identify weighed vehicles.

16. The method of claim 14, wherein said one or more detection devices are selected from the group consisting of speed detectors, height detectors, RFID transmitters/receivers, and cameras.

17. The method of claim 13, wherein said one or more detection devices includes a loop vehicle tracking network (LVTN).

18. The method of claim 13, wherein said one or more detection devices includes a image tracking network (ITN).

19. The method of claim 13, wherein said vehicle identification data includes the class of said vehicles and their speed at said WIM scale.

20. The method of claim 19, wherein said WIM scale correction factor is adjusted to account for said vehicle class, said vehicle speed, or both said vehicle class and said vehicle speed.

21. The method of claim 13, further comprising tracking said vehicles via a loop vehicle tracking network comprising a plurality of loops and queues as said vehicles move between said WIM scale and said static scale.

22. A method of auto-calibrating a WIM scale, comprising:
automatically transmitting weight data for at least some of a number of vehicles weighed by said WIM scale to a database;
weighing some number of vehicles weighed by said WIM scale on a static scale;
automatically transmitting weight data for at least some of said vehicles weighed by said static scale to a database;
providing vehicle identification data for vehicles weighed by both said WIM scale and said static scale;
providing vehicle class data for vehicles weighed by both said WIM scale and said static scale;
providing vehicle speed data for vehicles weighed by both said WIM scale and said static scale;
using said vehicle identification data to associate WIM scale weight data, vehicle class data and vehicle speed data with static scale weight data for the same vehicles;
placing a microprocessor-based device in communication with said WIM scale and said database(s), said microprocessor-based device for analyzing a collection of associated WIM scale weight data, static scale weight data, vehicle class data and vehicle speed data, said microprocessor-based device operative to periodically calculate a new class-based and/or speed-based WIM scale correction factor and to transmit said correction factor to said WIM scale.

23. The method of claim 22, further comprising using one or more detection devices to identify weighed vehicles, said detection devices are selected from the group consisting of speed detectors, height detectors, RFID transmitters/receivers, and cameras.

24. The method of claim 22, further comprising tracking said vehicles via a loop vehicle tracking network (LVTN) comprising a plurality of loops and queues as said vehicles move between said WIM scale and said static scale.

25. The method of claim 22, further comprising tracking said vehicles via an image tracking network (ITN) comprising one or more cameras as said vehicles move between said WIM scale and said static scale.

* * * * *